United States Patent
Alhussaini et al.

(10) Patent No.: US 9,623,987 B2
(45) Date of Patent: Apr. 18, 2017

(54) STRINGER ALIGNMENT TOOL

(71) Applicant: The Boeing Company, Chicago, IL (US)

(72) Inventors: Mohammed A. Alhussaini, Everett, WA (US); Paul Ronald Gehlsen, Bothell, WA (US)

(73) Assignee: THE BOEING COMPANY, Chicago, IL (US)

( * ) Notice: Subject to any disclaimer, the term of this patent is extended or adjusted under 35 U.S.C. 154(b) by 152 days.

(21) Appl. No.: 14/713,657

(22) Filed: May 15, 2015

(65) Prior Publication Data

US 2016/0332751 A1    Nov. 17, 2016

(51) Int. Cl.
| | |
|---|---|
| *G01B 5/25* | (2006.01) |
| *B64F 5/00* | (2017.01) |
| *B64C 1/06* | (2006.01) |
| *B64C 3/18* | (2006.01) |

(52) U.S. Cl.
CPC ............ *B64F 5/0081* (2013.01); *B64C 1/064* (2013.01); *B64C 3/182* (2013.01); *G01B 5/25* (2013.01)

(58) Field of Classification Search
CPC ........................................................ G01B 5/25
USPC ................ 33/520, 542, 544.5, 613, 645
See application file for complete search history.

(56) References Cited

U.S. PATENT DOCUMENTS

| | | | | |
|---|---|---|---|---|
| 3,711,955 | A | * 1/1973 | Holt | G01B 5/25 33/661 |
| 4,118,869 | A | * 10/1978 | Hartung | G01B 5/25 33/1 M |
| 4,403,860 | A | * 9/1983 | Pryor | G01B 11/00 33/542 |
| 6,751,881 | B1 | * 6/2004 | Hurley | F16L 55/30 15/104.05 |
| 8,209,838 | B2 | 7/2012 | Lindgren | |
| 2007/0119064 | A1 | * 5/2007 | Kraus | B43L 13/001 33/520 |
| 2013/0326891 | A1 | * 12/2013 | Alexander | G01B 5/25 33/228 |
| 2016/0031052 | A1 | * 2/2016 | Nisperos | B23P 19/10 29/407.05 |

OTHER PUBLICATIONS

Gehlsen, "Composite Panel Tool," U.S. Appl. No. 14/337,679, filed Jul. 22, 2014, 55 pages.

* cited by examiner

*Primary Examiner* — G. Bradley Bennett
(74) *Attorney, Agent, or Firm* — Yee & Associates, P.C.

(57) ABSTRACT

A method and apparatus for aligning stringers. A tool comprises an index feature, a body, a number of legs, and a biasing member. The index feature indicates a centerline of an enclosure. The body has a longitudinal axis running substantially parallel to the centerline of the enclosure. The number of legs is moveably associated with the body. The biasing member contacts the body. The biasing member biases the number of legs towards a selected position.

20 Claims, 14 Drawing Sheets

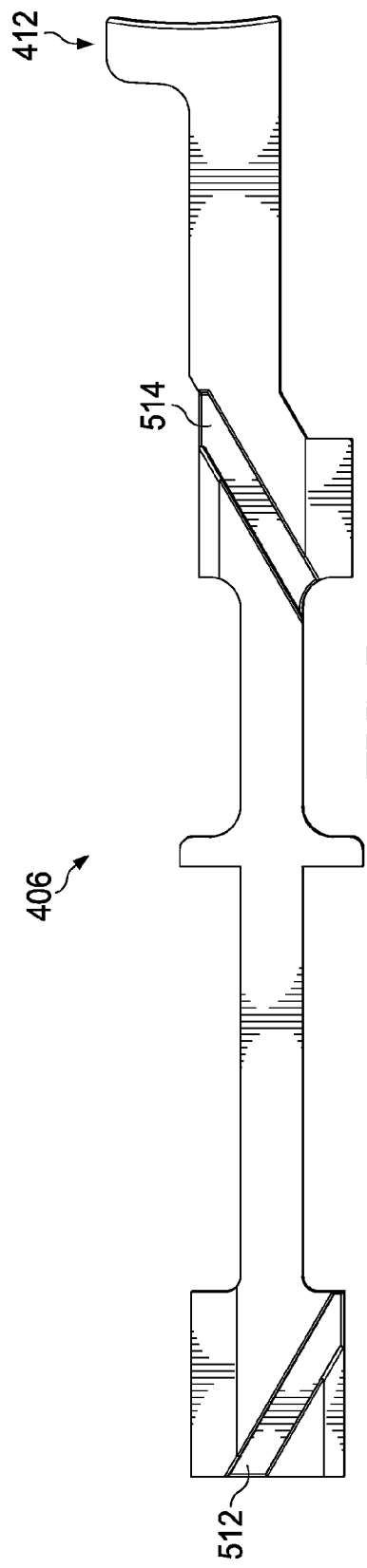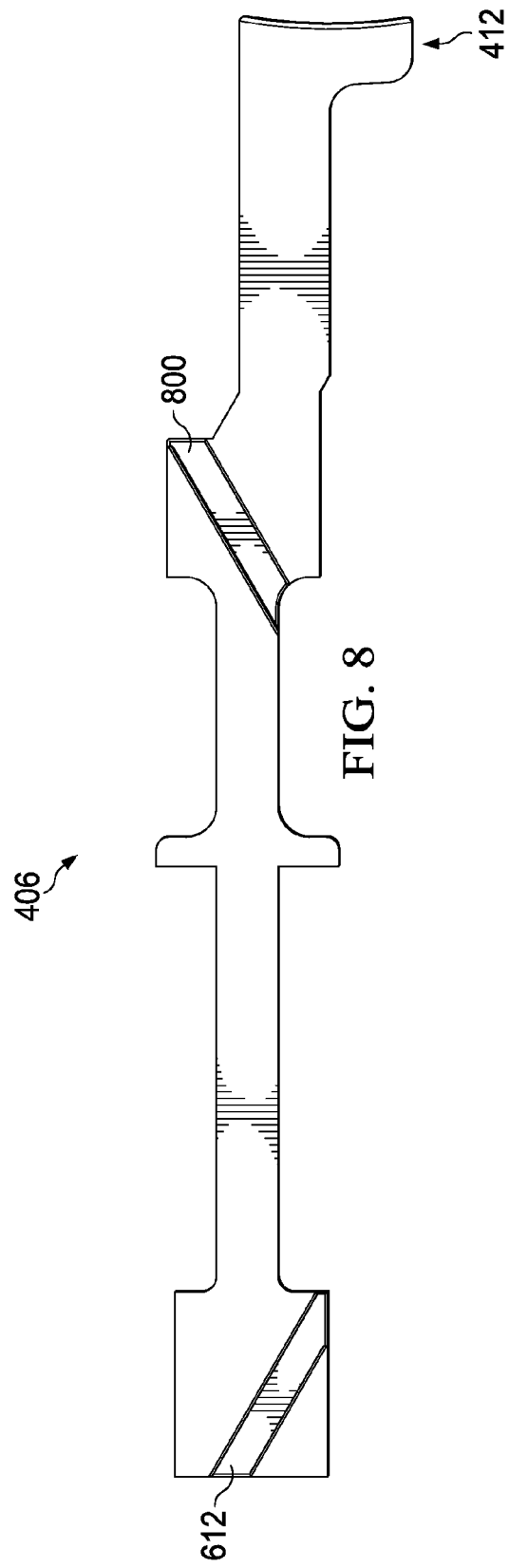

STRINGER ALIGNMENT TOOL

BACKGROUND INFORMATION

1. Field

The present disclosure relates generally to tools for aligning structures and, in particular, to aligning enclosures. More particularly, the present disclosure relates to a method and apparatus for aligning stringers.

2. Background

Aircraft generally include an airframe, which may be regarded as an underlying skeleton to which skins are attached to form a smooth aerodynamic outer surface. The wings also include an underlying structure covered with skins. Typically, skins are light and thin to minimize the weight of the aircraft and increase its payload and range. Since skins are thin, they are generally flexible and require stiffening to prevent undesired movement, flexing, and vibration during flight.

Stringers of various shapes may be used for stiffening fuselage sections and wing skins on aircraft. These stringers may have acute angles that result in an I shape, a J shape, a trapezoidal shape, a rectangular shape, a semi-circular shape, or some other suitable shape.

Aircraft are being designed and manufactured with greater and greater percentages of composite materials. Composite materials are used in aircraft to decrease the weight of the aircraft. This decreased weight improves performance features such as payload capacity and fuel efficiency. Further, composite materials provide longer service life for various components in an aircraft.

Composite materials may be tough, light-weight materials created by combining two or more functional components. For example, a composite material may include reinforcing fibers bound in a polymer resin matrix. The fibers may be unidirectional or may take the form of a woven cloth or fabric. The fibers and resins may be arranged and cured to form a composite structure.

Composite stringers may be attached to a composite skin using fasteners, curing the composite stringers to the composite skin, or by other desirable methods. When composite stringers are cured directly to a composite skin, pressure may be applied to the composite stringers.

When composite stringers are cured directly to a composite skin, the composite stringers and composite skin may form a composite panel. When a portion of the composite panel is reworked, a rework panel may be aligned to the composite panel. Determining alignment of the rework panel may be more difficult or more time-consuming than desired. Therefore, it would be desirable to have a method and apparatus that take into account at least some of the issues discussed above, as well as other possible issues.

SUMMARY

In an illustrative embodiment, a tool is provided. The tool comprises an index feature, a body, a number of legs, and a biasing member. The index feature indicates a centerline of an enclosure. The body has a longitudinal axis running substantially parallel to the centerline of the enclosure. The number of legs is moveably associated with the body. The biasing member contacts the body. The biasing member biases the number of legs towards a selected position.

In another illustrative embodiment, a tool is provided. The tool comprises a casing, a body, a number of legs, and a biasing member. The casing has an index feature. The body has a number of wedge grooves within the casing and an interactive feature outside of the casing. The number of legs is movable relative to the body. Each leg of the number of legs has a respective protrusion that interacts with a respective wedge groove of the number of wedge grooves. A biasing member is associated with the body and configured to bias the number of legs outward from the body.

A further illustrative embodiment of the present disclosure provides a method. A first tool is inserted into a first stringer. The first tool comprises a first index feature indicating a centerline of the first stringer, a body having a longitudinal axis running substantially parallel to the centerline of the first stringer, a number of legs moveably associated with the body, and a biasing member that contacts the body. The biasing member biases the number of legs towards a selected position. A second tool is inserted into a second stringer. The first index feature of the first tool is compared to a second index feature of the second tool.

The method and apparatuses disclosed herein may standardize the process of aligning enclosures. Using an alignment tool, enclosures such as those formed by a stringer and a skin may be aligned. A value of the actual variation in alignment may be determined using two alignment tools. A first alignment tool may be used in a first enclosure. The first enclosure may be a stringer. A second alignment tool may be used in a second enclosure. The second enclosure may be a stringer. By comparing respective index features of the first and second alignment tools, a value of the variation in alignment between the centerline of the first enclosure and a centerline of the second enclosure may be determined.

Further, using alignment tools allows for verification of an actual variation of the alignment throughout a rework process. The alignment tools may stay within the enclosures until it is desirable to remove them. As a result, the variation in alignment may be determined several times while aligning enclosures.

By using the alignment tools, measurements from operator to operator may be consistent. Further, by using the alignment tools, measurements may be taken faster than when using conventional practices. Yet further, by using the alignment tools, measurements may be taken more easily than when using conventional practices.

The alignment tools may be used with a variety of shapes and sizes of enclosures. By having rounded ends or rounded adapters, the alignment tool may engage the sides of a variety of different enclosures. By using adapters, an alignment tool may be changed to accommodate a different shape or size than may be accommodated with the rounded ends of the legs of the alignment tool.

The alignment tools are self-centering within an enclosure. As a result, the installation of the alignment tools may be performed without special training or knowledge. The alignment tools may maintain their position within an enclosure regardless of how the enclosure is moved. As a result, the alignment tools may be used in a variety of locations and under a variety of conditions. Further, the alignment tools may not pose a safety risk as falling debris.

The designed tool self aligns and symmetrically expands to find the common stringer centerline of the airplane and repair panel sides regardless of minute fabrication anomalies or variation. It provides index planes for the technician to measure misalignment. After measuring the delta between the two opposing tools, the technician can adjust the panel positioning for a best fit condition.

Conventionally, there is no solution to locate and index panels in the event of a repair. Panels potentially as long as a barrel section holding a centerline alignment between stringers have proven to be difficult due to the wide range of stringer sizes and the variability of the stringer geometry as fabricated. These variables create difficulties while trying to establish true centerline from one panel to another.

The tool standardizes and refines a critical step in large area repairs allowing a technician to easily align and verify the relative position of the new panel to existing structure. The tool also allows a quality assurance inspector to verify and record the actual variation of the alignment at any point during the repair. Variations should be acknowledged, recorded, and given disposition by engineering to efficiently return the aircraft to service.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 7 is an illustration of a top view of a body of an alignment tool in accordance with an illustrative embodiment;

FIG. 8 is an illustration of a bottom view of a body of an alignment tool in accordance with an illustrative embodiment;

DETAILED DESCRIPTION

Figure 1:
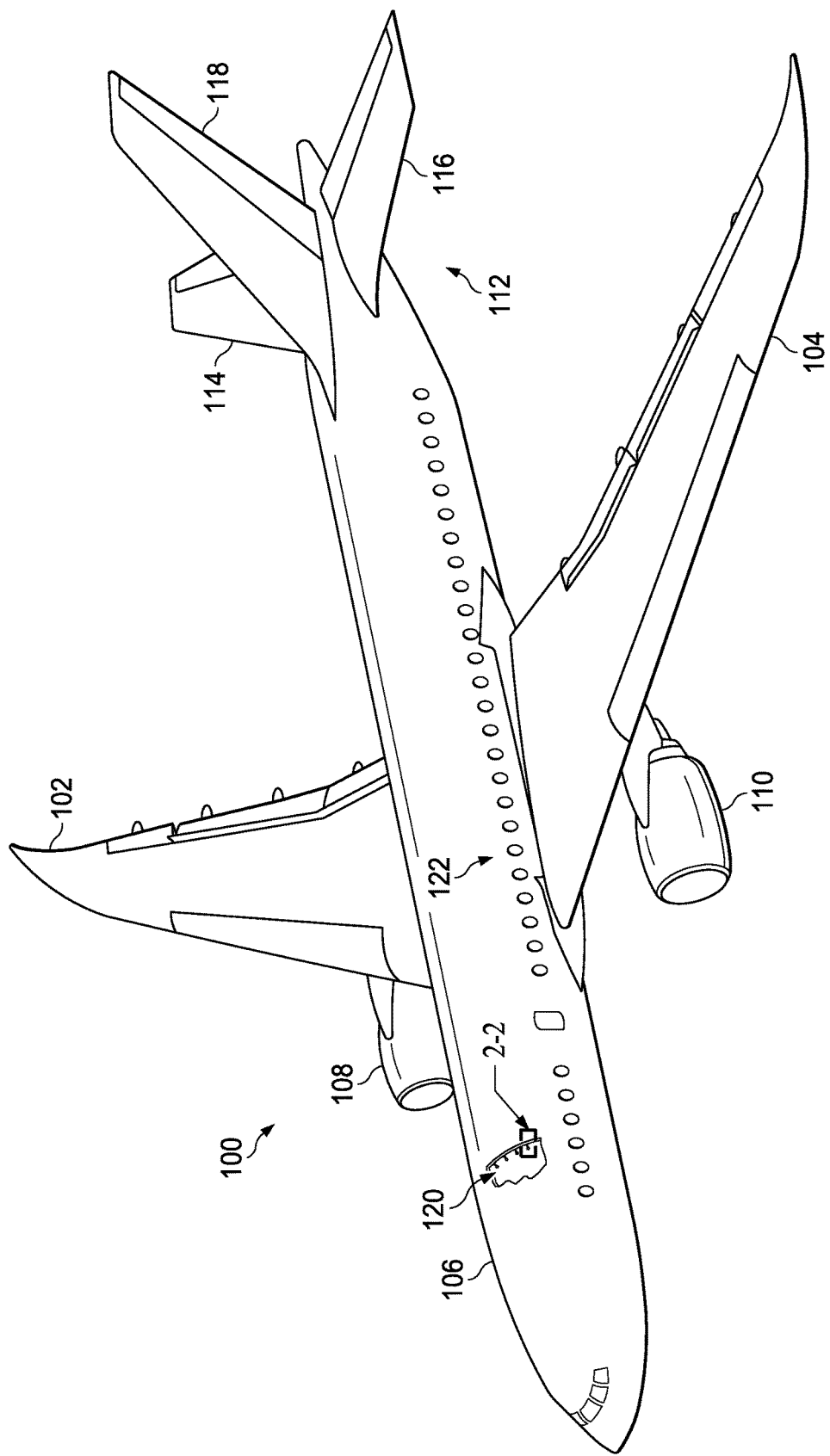
FIG. 1 is an illustration of an aircraft in which an illustrative embodiment may be implemented.

With reference now to the figures, and in particular, with reference to FIG. 1, an illustration of an aircraft is depicted in which an illustrative embodiment may be implemented. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft having stringers in which an alignment tool may be used in accordance with an illustrative embodiment. For example, when joining portions of wing 102, wing 104, or body 106, an alignment tool may be used. FIG. 1 depicts an exposed view of stiffeners 120. An alignment tool may be positioned within one of stiffeners 120 such that the alignment tool contacts the stiffener and composite skin 122. An alignment tool may be used in one of stiffeners 120 to verify alignment when connecting two portions of body 106.

This illustration of aircraft 100 is provided for purposes of illustrating one environment in which the different illustrative embodiments may be implemented. The illustration of aircraft 100 in FIG. 1 is not meant to imply architectural limitations as to the manner in which different illustrative embodiments may be implemented. For example, aircraft 100 is shown as a commercial passenger aircraft. The different illustrative embodiments may be applied to other types of aircraft, such as private passenger aircraft, a rotorcraft, and other suitable type of aircraft.

Figure 2:
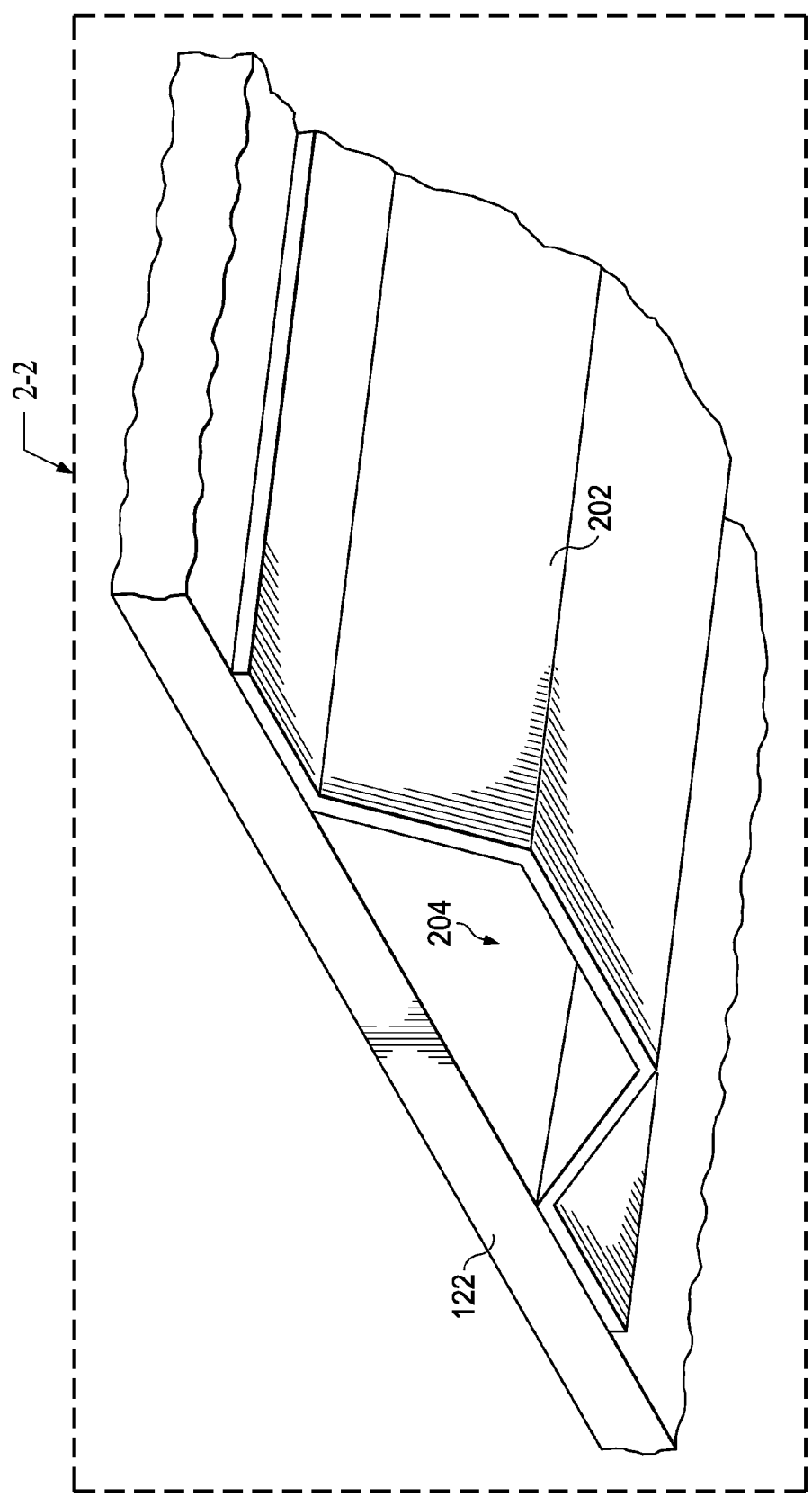
FIG. 2 is an illustration of a stringer which may be aligned in accordance with an illustrative embodiment.

Turning now to FIG. 2, an illustration of a stringer which may be aligned using an alignment tool is depicted in accordance with an illustrative embodiment. Specifically, FIG. 2 is an enlarged view of stiffener 202 of stiffeners 120 in section 2-2 of FIG. 1.

As depicted, stiffener 202 is a hat shaped stringer. As depicted, a hat shaped stringer has a channel with trapezoidal cross-sectional shape 204. Stiffener 202 is a composite member. Composite skin 122 is also a composite member.

Figure 3:
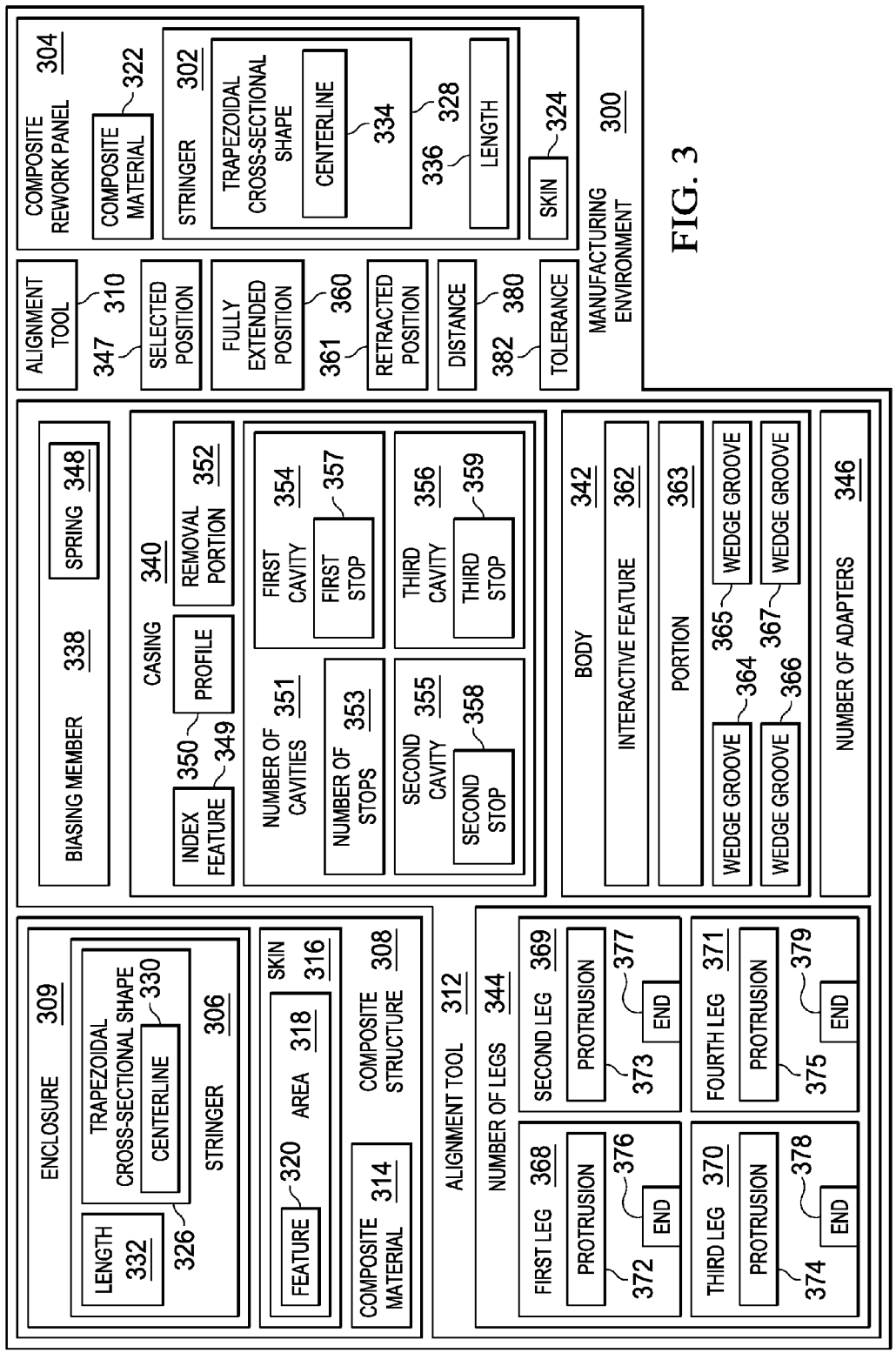
FIG. 3 is an illustration of a block diagram of a manufacturing environment in accordance with an illustrative embodiment.

Turning now to FIG. 3, an illustration of a block diagram of a manufacturing environment is depicted in accordance with an illustrative embodiment. Manufacturing environment 300 may be used to align stringer 302 in composite rework panel 304 relative to stringer 306 of composite structure 308. Stringer 306 and composite structure 308 may form enclosure 309. Alignment tool 310 and alignment tool 312 may be used to align stringer 302 relative to stringer 306. By aligning stringer 302 relative to stringer 306, composite rework panel 304 may also be aligned relative to composite structure 308.

Composite structure 308 is formed of composite material 314. Composite structure 308 includes stringer 306 and skin 316. Skin 316 has area 318 including feature 320. Feature 320 may be an undesirable feature such as an uneven thickness, a chip, a crack, debris, or other type of inconsistency. Composite structure 308 may be reworked to remove feature 320. Area 318 may be removed from composite structure 308 to remove feature 320.

Skin 316 may be co-cured with stringer 306. Area 318 of skin 316 may not be able to be removed from stringer 306. When removing area 318, a portion of stringer 306 and other stringers within area 318 may also be removed. Composite rework panel 304 may be used to replace area 318 and any portions of stringer 306 that are removed. Composite rework panel 304 may be formed of composite material 322 and have the same layup as the removed portion of composite structure 308. Stringer 302 may have the same layup as stringer 306. Skin 324 may have the same layup as skin 316.

To install composite rework panel 304 relative to composite structure 308, skin 324 will be positioned relative to skin 316. Further, to install composite rework panel 304 relative to composite structure 308, stringer 302 will be positioned relative to stringer 306.

Stringer 306 has trapezoidal cross-sectional shape 326. Stringer 306 and skin 316 form enclosure 309. Stringer 302 also has trapezoidal cross-sectional shape 328. Stringer 302 and skin 324 may form an enclosure. Trapezoidal cross-sectional shape 326 is substantially the same as trapezoidal cross-sectional shape 328. Trapezoidal cross-sectional shape 326 has centerline 330. Centerline 330 extends along length 332 of stringer 306. Trapezoidal cross-sectional shape 328 has centerline 334. Centerline 334 extends along length 336 of stringer 302. To align stringer 302 to stringer 306, centerline 330 and centerline 334 may be positioned within a selected tolerance of each other.

To align stringer 302 relative to stringer 306, alignment tool 310 is positioned within stringer 302. To align stringer 306 relative to stringer 302, alignment tool 312 is positioned within stringer 306. Alignment tool 310 may have the same configuration as alignment tool 312.

Alignment tool 312 includes biasing member 338, casing 340, body 342, and number of legs 344. As used herein, a "number of" items means one or more items. For example, number of legs 344 may be one or more legs. In some illustrative examples, alignment tool 312 may also include number of adapters 346.

Biasing member 338 contacts body 342. Number of legs 344 is moveably associated with body 342. Biasing member 338 biases number of legs 344 into selected position 347. Biasing member 338 biases number of legs 344 to move outward from body 342. Selected position 347 may also be referred to as an engaged position. In selected position 347, alignment tool 312 may engage stringer 306. In some illustrative examples, Biasing member 338 may take the form of spring 348.

Casing 340 has index feature 349, profile 350, number of cavities 351, and removal portion 352. Index feature 349 may indicate centerline 330. Profile 350 may be designed such that casing 340 fits within trapezoidal cross-sectional shape 326 of stringer 306. Profile 350 may be designed such that casing 340 does not contact stringer 306.

Number of cavities 351 includes number of stops 353. Each of number of cavities 351 has a respective stop for body 342. Each of number of stops 353 may interact with body 342 to restrict the motion of body 342. For example, a stop in number of stops 353 may restrict body 342 from going beyond a set limit in a first direction. As another example, a stop in number of stops 353 may restrict body 342 from going beyond a set limit in a second direction.

Number of cavities 351 may include first cavity 354, second cavity 355, and third cavity 356. Each of number of cavities 351 may have a respective stop for body 342. First cavity 354 has first stop 357. Second cavity 355 has second stop 358. Third cavity 356 has third stop 359. First stop 357, second stop 358, and third stop 359 may be at least a portion of number of stops 353. Each of first stop 357, second stop 358, and third stop 359 may restrict body 342 from traveling past a position such that number of legs 344 is in fully extended position 360. First stop 357, second stop 358, and third stop 359 may provide force opposite the bias of biasing member 338.

In some illustrative examples, number of stops 353 may also include at least one stop that restricts body 342 from traveling past a position such that number of legs 344 is in retracted position 361. With number of legs 344 in retracted position 361, alignment tool 312 may be removed from stringer 306.

To place number of legs 344 into retracted position 361, a user may interact with interactive feature 362. Interacting with interactive feature 362 causes number of legs 344 to move relative to body 342. Interacting with interactive feature 362 actuates biasing member 338. A user may counteract spring 348 by applying pressure to interactive feature 362.

Casing 340 contains portion 363 of body 342. A remainder portion of body 342 forms interactive feature 362. Casing 340 has removal portion 352 that aids in removal of alignment tool 312 from stringer 306.

Body 342 has a longitudinal axis running substantially parallel to centerline 330 of enclosure 309. Body 342 also has a number of wedge grooves within casing 340. Body 342 has wedge groove 364, wedge groove 365, wedge groove 366, and wedge groove 367. Each of number of legs 344 has a respective protrusion that is associated with a respective wedge groove of the number of wedge grooves. For example, number of legs 344 includes first leg 368, second leg 369, third leg 370, and fourth leg 371. First leg 368 may have protrusion 372. Second leg 369 may have protrusion 373. Third leg 370 may have protrusion 374. Fourth leg 371 may have protrusion 375.

Each of protrusion 372, protrusion 373, protrusion 374, and protrusion 375 are associated with a respective one of wedge groove 364, wedge groove 365, wedge groove 366, and wedge groove 367. Each wedge groove may act as a track for a respective wedge groove. As body 342 moves, each of wedge groove 364, wedge groove 365, wedge groove 366, and wedge groove 367 may push a respective one of protrusion 372, protrusion 373, protrusion 374, and protrusion 375 to move number of legs 344.

A double wedge may be formed of opposing wedge grooves. For example, a double wedge may be formed by wedge groove 364 and wedge groove 366. As a result of wedge groove 364 and wedge groove 366, first leg 368 and third leg 370 may move symmetrically together outward of body 342. A double wedge may be formed by wedge groove 365 and wedge groove 367. As a result of wedge groove 365 and wedge groove 367, second leg 369 and fourth leg 371 may move symmetrically together outward of body 342.

Each of number of legs 344 has an end with a rounded shape. For example, first leg 368 has end 376. Second leg 369 has end 377. Third leg 370 has end 378. Fourth leg 371 has end 379.

End 376, end 377, end 378, and end 379 contact stringer 306 and skin 316 when number of legs 344 is in selected position 347. End 376, end 377, end 378, and end 379 may have desirable shapes and sizes to contact stringer 306 and skin 316. In some illustrative examples, end 376, end 377, end 378, and end 379 may not have desirable shapes or sizes for contacting stringer 306 and skin 316.

In these illustrative examples, number of adapters 346 is associated with number of legs 344. In these illustrative examples, number of adapters 346 may be positioned over end 376, end 377, end 378, and end 379. In these illustrative examples, number of adapters 346 contacts stringer 306 and skin 316. In some examples, number of adapters 346 may include a variety of sizes of adapters. In these examples, one set of number of adapters 346 may be positioned over end 376, end 377, end 378, and end 379 so that the set of adapters contacts stringer 306 and skin 316.

When alignment tool 312 is present within stringer 306 and alignment tool 310 is within stringer 302, index feature 349 may be compared to an index feature of alignment tool 310. Distance 380 between index feature 349 and an index feature of alignment tool 310 may be measured. When distance 380 is within tolerance 382, stringer 302 and stringer 306 may be desirably aligned.

The illustration of manufacturing environment 300 in FIG. 3 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although an enclosure is described as being formed by a stringer and a skin, alignment tool 312 may be used with any desirable enclosure. For example, alignment tool 312 may be used to align enclosures of corrugated structures, enclosures of hollow core structures, or other desirable types of enclosures.

Figure 4:
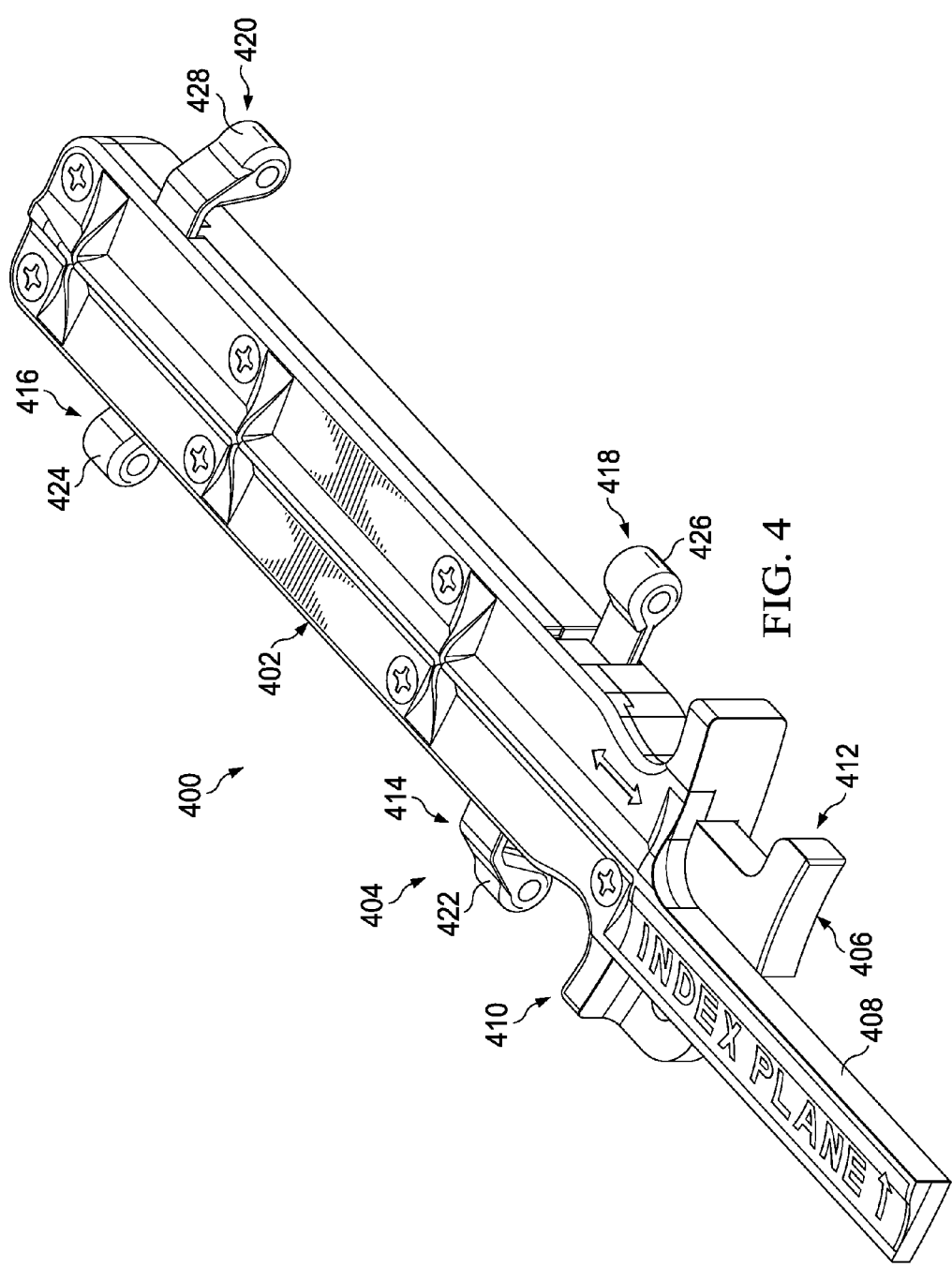
FIG. 4 is an illustration of an isometric view of an alignment tool in accordance with an illustrative embodiment.

Turning now to FIG. 4, an illustration of an isometric view of an alignment tool is depicted in accordance with an illustrative embodiment. Alignment tool 400 may be a physical implementation of one of alignment tool 310 or alignment tool 312. As depicted, alignment tool 400 has casing 402, number of legs 404, and body 406. Casing 402 includes index feature 408 and removal portion 410. Index feature 408 may indicate a centerline of an enclosure while alignment tool 400 is in the enclosure. Removal portion 410 may provide ergonomics for removing alignment tool 400. To remove alignment tool 400 from an enclosure, a user may depress interactive feature 412 with their thumb while pressing against removal portion 410 with their fingers. Removal portion 410 and interactive feature 412 may allow for removal with a single hand.

Number of legs 404 includes first leg 414, second leg 416, third leg 418, and fourth leg 420. First leg 414 has rounded end 422. Second leg 416 has rounded end 424. Third leg 418 has rounded end 426. Fourth leg 420 has rounded end 428.

A biasing member (not depicted) may move first leg 414 and third leg 418 symmetrically outward. The biasing member may also move second leg 416 and fourth leg 420 symmetrically outward. By moving number of legs 404 symmetrically outward, alignment tool 400 may locate a centerline of an enclosure.

Figure 5:
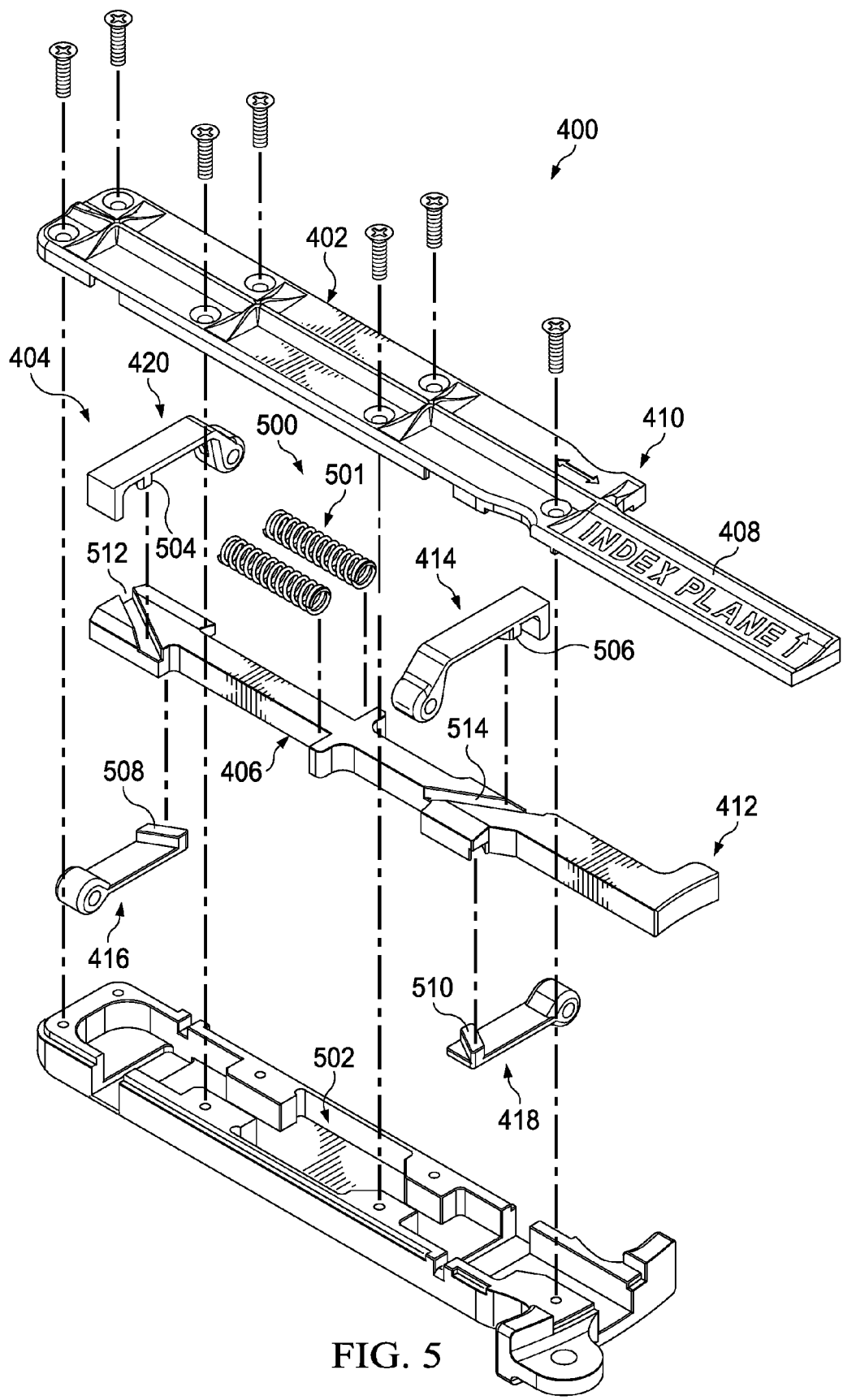
FIG. 5 is an illustration of an exploded view of an alignment tool in accordance with an illustrative embodiment.

Turning now to FIG. 5, an illustration of an exploded view of an alignment tool is depicted in accordance with an illustrative embodiment. FIG. 5 may be an exploded view of alignment tool 400 shown in FIG. 4. In this exploded view, biasing member 500, biasing member 501, and number of cavities 502 are visible. Further, protrusion 504, protrusion 506, protrusion 508, and protrusion 510 of number of legs 404 can be seen. Each of protrusion 504, protrusion 506, protrusion 508, and protrusion 510 may interact with a respective wedge groove of body 406. For example, protrusion 504 may interact with wedge groove 512 of body 406. As another example, protrusion 506 may interact with wedge groove 514 of body 406.

Figure 6:
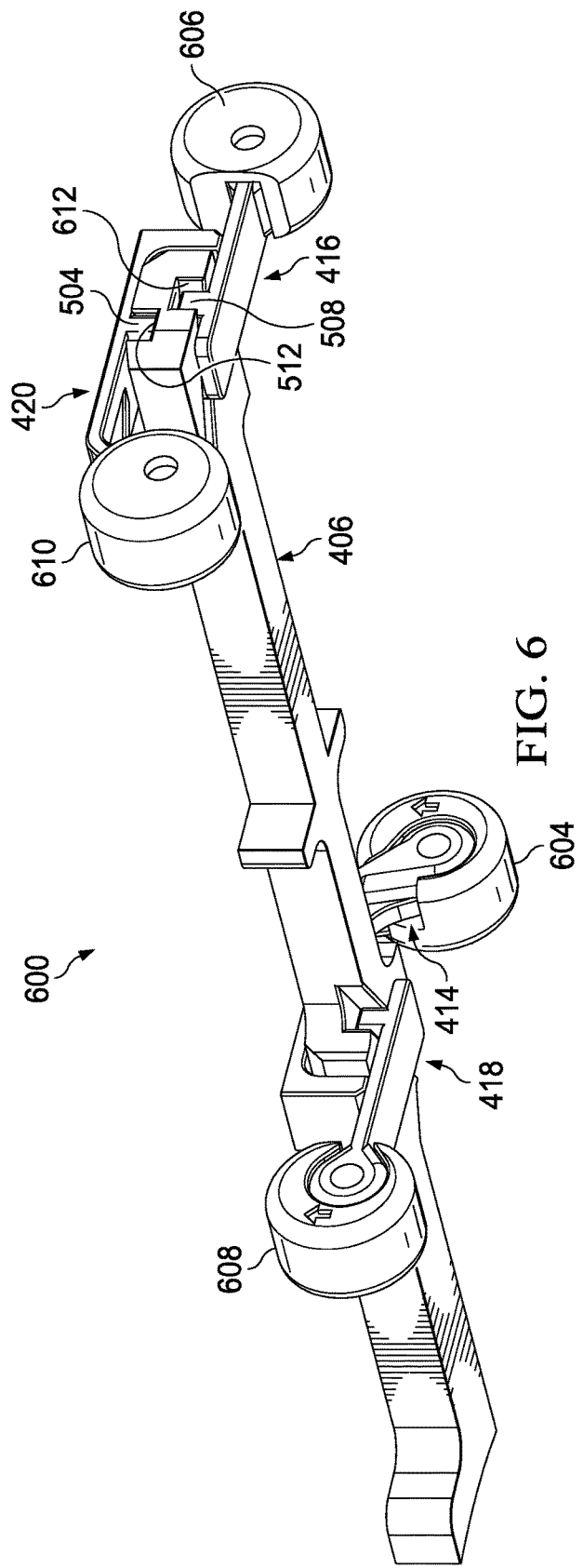
FIG. 6 is an illustration of an isometric view of an alignment tool with the casing removed in accordance with an illustrative embodiment.

Turning now to FIG. 6, an illustration of a back isometric view of an alignment tool with the casing removed is depicted in accordance with an illustrative embodiment. View 600 is a view of alignment tool 400 with casing 402 removed. Further, in view 600, number of adapters is associated with number of legs 404. First adapter 604 is associated with first leg 414. Second adapter 606 is associated with second leg 416. Third adapter 608 is associated with third leg 418. Fourth adapter 610 is associated with fourth leg 420. As can be seen in view 600, protrusion 504 is seated within wedge groove 512 of body 406. Protrusion 508 is seated within wedge groove 612.

Turning now to FIG. 7, an illustration of a top view of a body of an alignment tool is depicted in accordance with an illustrative embodiment. FIG. 7 is a top view of body 406 of FIG. 4. As can be seen in FIG. 7, body 406 has wedge groove 512 and wedge groove 514.

Turning now to FIG. 8, an illustration of a bottom view of a body of an alignment tool is depicted in accordance with an illustrative embodiment. FIG. 8 is a bottom view of body 406 of FIG. 4. As can be seen in FIG. 8, body 406 has wedge groove 612 and wedge groove 800. Wedge groove 612 may interact with protrusion 508 of FIG. 5. Wedge groove 800 may interact with protrusion 510 of FIG. 5.

Figure 9:
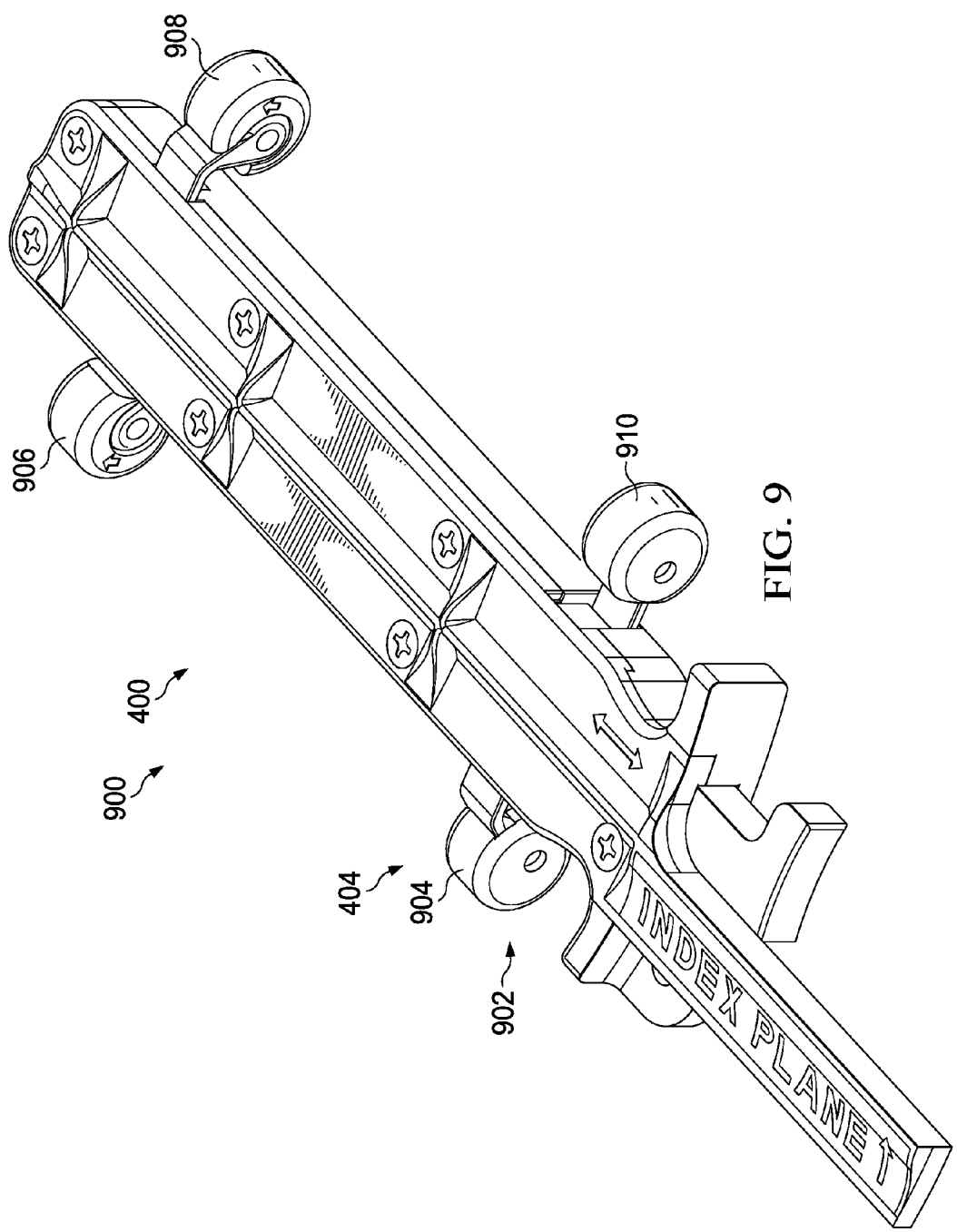
FIG. 9 is an illustration of an isometric view of an alignment tool with a number of adapters in accordance with an illustrative embodiment.

Turning now to FIG. 9, an illustration of an isometric view of an alignment tool with a number of adapters is depicted in accordance with an illustrative embodiment. In view 900, number of adapters 902 is associated with number of legs 404 of alignment tool 400. Number of adapters 902 may be the same as number of adapters in FIG. 6. In some illustrative examples, number of adapters 902 may be different sizes than number of adapters in FIG. 6. Number of adapters 902 includes adapter 904, adapter 906, adapter 908, and adapter 910.

Figure 10:
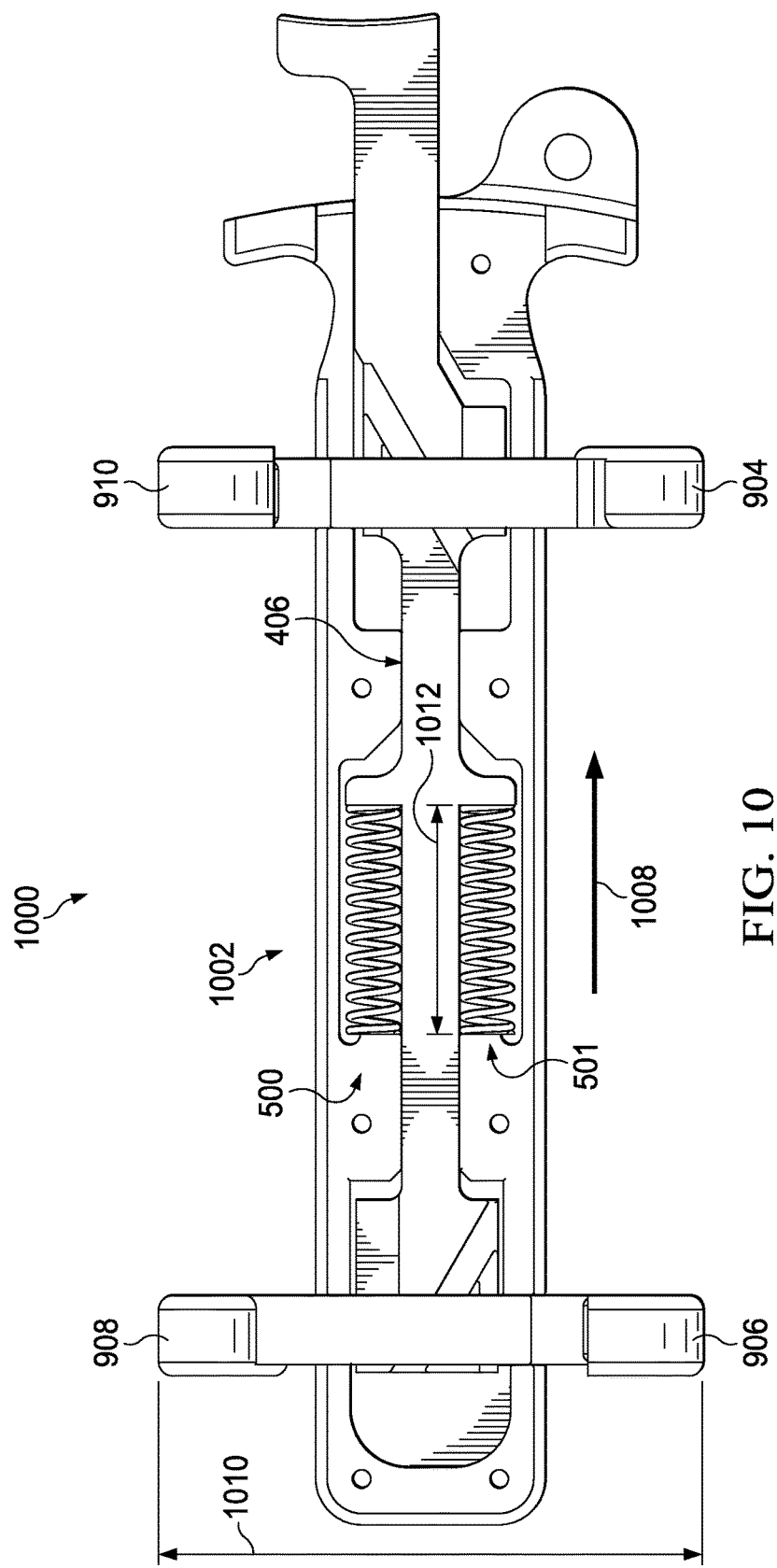
FIG. 10 is an illustration of a top view of an alignment tool with a number of adapters and with a portion of a casing removed in accordance with an illustrative embodiment.

Turning now to FIG. 10, an illustration of a top view of an alignment tool with a number of adapters and with a transparent portion of a casing is depicted in accordance with an illustrative embodiment. In view 1000, the top portion of casing 402 is transparent. As depicted, alignment tool 400 is in fully extended position 1002. Biasing member 500 and biasing member 501 press against body 406. Biasing member 500 and biasing member 501 bias body 406 in direction 1008. By biasing body 406, biasing member 500 and biasing member 501 increase the distance between adapter 906 and adapter 908. In fully extended position 1002, length 1010 may extend from the edge of adapter 906 to the edge of adapter 908. When alignment tool 400 is in fully extended position 1002, spring 1004 and spring 1006 may each have length 1012.

Figure 11:
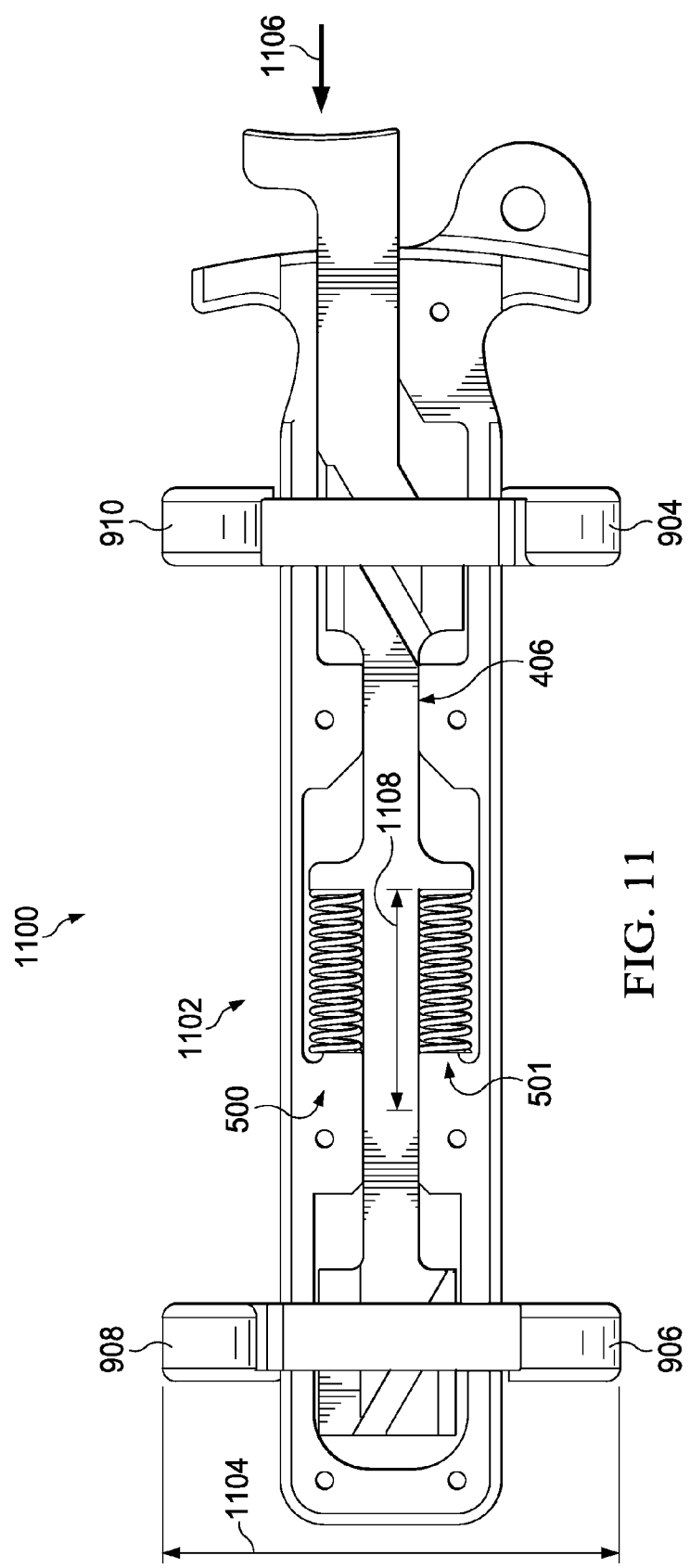
FIG. 11 is an illustration of a top view of an alignment tool with a number of adapters and with a portion of a casing removed in accordance with an illustrative embodiment.

Turning now to FIG. 11, an illustration of a top view of an alignment tool with a number of adapters and with a transparent portion of a casing is depicted in accordance with an illustrative embodiment. In view 1100, the top portion of casing 402 is transparent. As depicted, alignment tool 400 is in retracted position 1102. In retracted position 1102, length 1104 between edge of adapter 908 and edge of adapter 910 is less than length 1010 when alignment tool 400 is in fully extended position 1002 as in FIG. 10.

To place alignment tool 400 in retracted position 1102, a user may apply pressure to interactive feature 412 in direction 1106. In retracted position 1102, spring 1004 and spring 1006 may have length 1108. Length 1108 may be shorter than length 1012 of spring 1004 and spring 1006 in FIG. 10.

Figure 12:
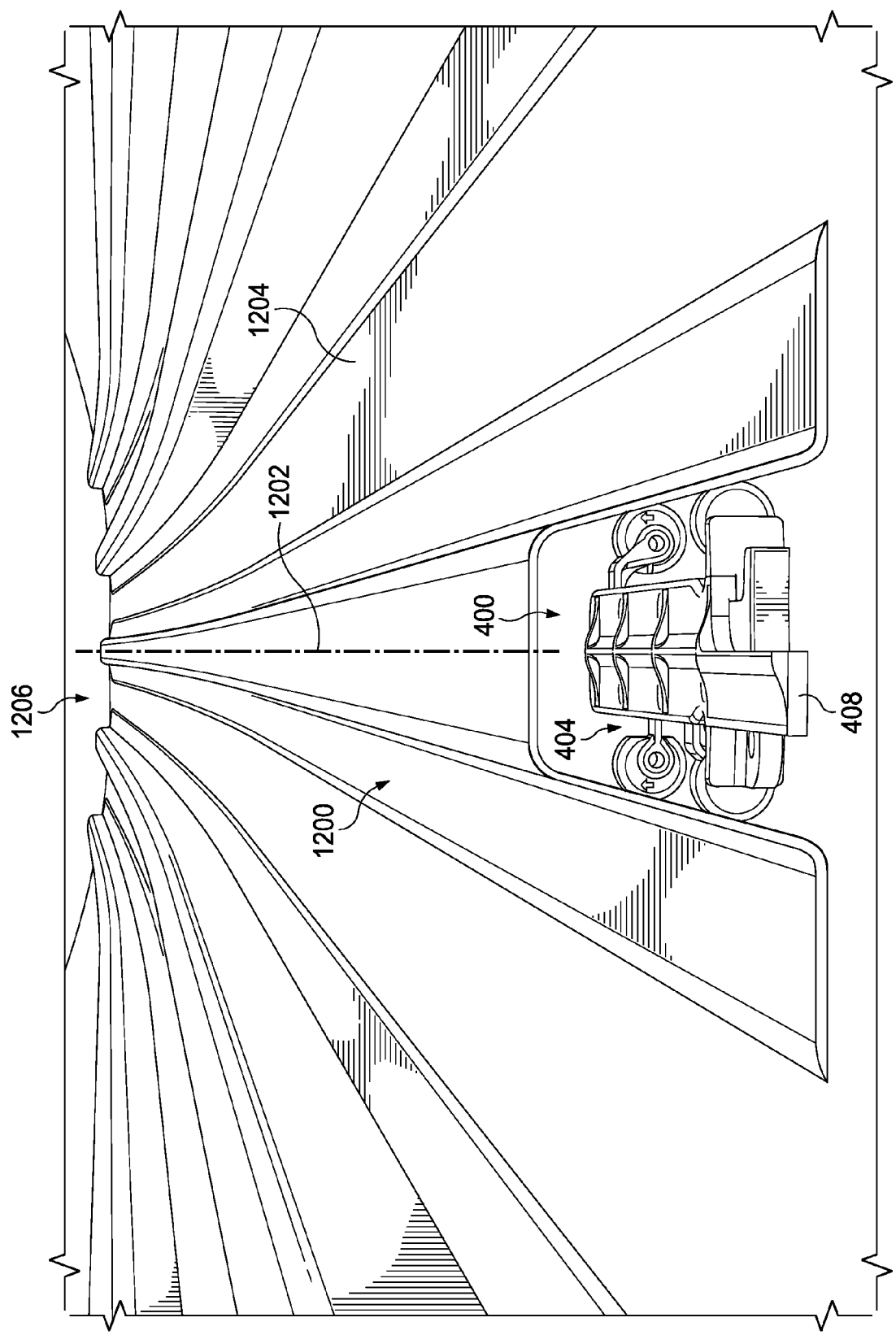
FIG. 12 is an illustration of a front view of an alignment tool in a stringer in accordance with an illustrative embodiment.

Turning now to FIG. 12, an illustration of a front view of an alignment tool in a stringer is depicted in accordance with an illustrative embodiment. As depicted, alignment tool 400 is shown within stringer 1200. Stringer 1200 may be a physical implementation of stringer 306 of FIG. 3. In some illustrative examples, stringer 1200 may be another view of stiffener 202 of FIG. 2.

As depicted, number of adapters 902 is biased into contact with stringer 1200. Pressure applied by biasing member 500 and biasing member 501 (not depicted) is sufficient to hold alignment tool 400 in place relative to stringer 1200. Biasing member 500 and biasing member 501 (not depicted) apply equal pressure to each of number of legs 404. By applying equal pressure to each of number of legs 404, biasing member 500 and biasing member 501 (not depicted) may automatically center alignment tool 400 within stringer 1200. When alignment tool 400 is positioned within stringer 1200, index feature 408 of alignment tool 400 may indicate centerline 1202 of stringer 1200.

Stringer 1200 is attached to skin 1204 of composite structure 1206. Alignment tool 400 may be used to align stringer 1200 of composite structure 1206 with another stringer on a separate composite structure. In some illustrative examples, another stringer of composite structure 1206 may have a respective alignment tool.

Figure 13:
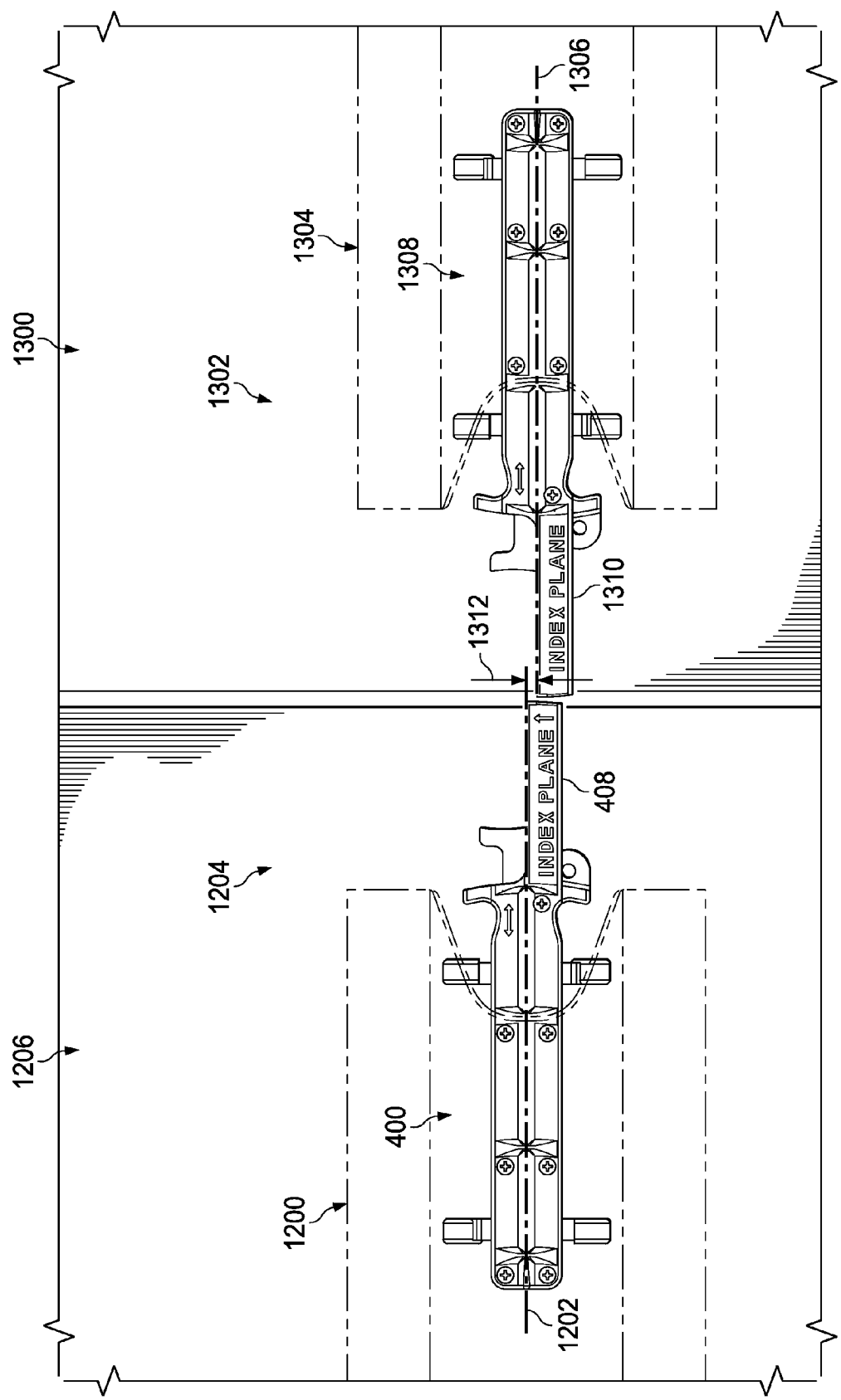
FIG. 13 is an illustration of a top view of two alignment tools within stringers in accordance with an illustrative embodiment.

Turning now to FIG. 13, an illustration of a top view of two alignment tools within stringers is depicted in accordance with an illustrative embodiment. In this illustrative example, composite rework panel 1300 is positioned relative to composite structure 1206. Composite rework panel 1300 includes skin 1302 and stringer 1304. Composite rework panel 1300 may be a physical implementation of composite rework panel 304 of FIG. 3. Skin 1302 may have the same composite layup as skin 1204. Stringer 1304 may have the same composite layup as stringer 1200. Stringer 1304 has centerline 1306.

To install composite rework panel 1300 relative to composite structure 1206, centerline 1202 and centerline 1306 are positioned within a desired tolerance relative to each other. To determine the position of centerline 1202 and centerline 1306 relative to each other, alignment tool 400 and alignment tool 1308 may be compared. Index feature 408 of alignment tool 400 indicates centerline 1202 of stringer. Index feature 1310 of alignment tool 1308 indicates centerline 1306 of stringer 1304. By comparing index feature 408 to index feature 1310, the position of centerline 1202 may be compared to the position of centerline 1306.

Distance 1312 between index feature 408 and index feature 1310 may be measured to determine the distance between centerline 1202 and centerline 1306. When distance 1312 is an acceptable value, composite rework panel 1300 may be attached to composite structure 1206. Distance 1312 is an acceptable value when distance 1312 is within tolerances.

As depicted, both stringer 1200 and stringer 1304 are partially transparent. This partial transparency is only for demonstration. Stringer 1200 and stringer 1304 may be opaque in structural applications.

Figure 14:
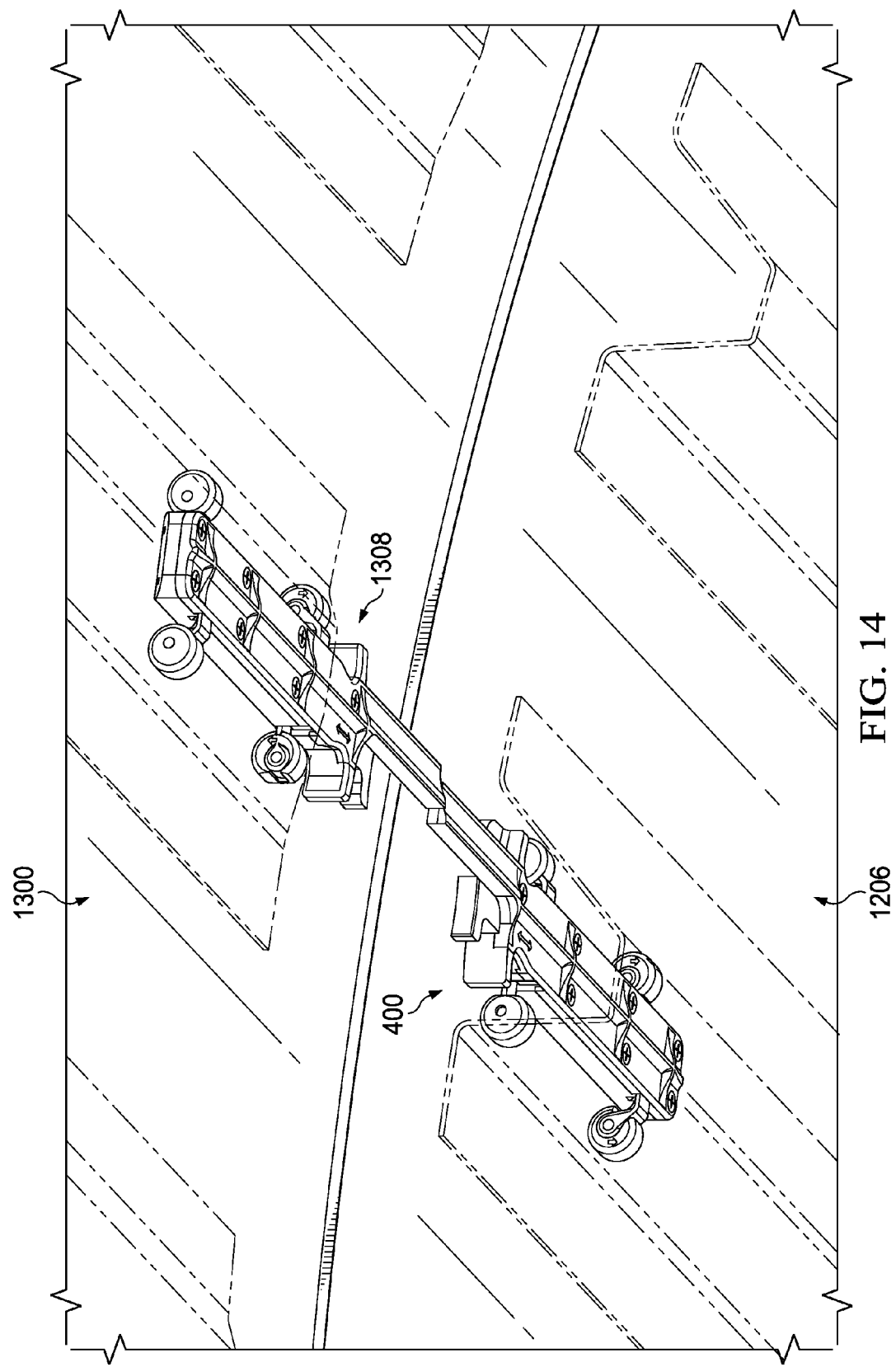
FIG. 14 is an illustration of an isometric view of two alignment tools within stringers in accordance with an illustrative embodiment.

Turning now to FIG. 14, an illustration of an isometric view of two alignment tools within stringers is depicted in accordance with an illustrative embodiment. FIG. 14 is an isometric view of composite rework panel 1300 and composite structure 1206 with alignment tool 400 and alignment tool 1308. As can be seen in FIG. 14, alignment tool 400 and alignment tool 1308 may self-maintain their positions within composite structure 1206 and composite rework panel 1300, respectively. Although stringer 1200 and stringer 1304 are facing the ground, pressure from their respective biasing members maintains the positions of alignment tool 400 and alignment tool 1308 within stringer 1200 and stringer 1304, respectively.

Although the alignment tools have been used to describe aligning individual stringers, additional alignment tools may be used to align the remainder of composite rework panel 1300. In some illustrative examples, more than two alignment tools may be used simultaneously to align composite structure 1206 and composite rework panel 1300. For example, an alignment tool may be positioned in a respective stringer of each corner of composite rework panel 1300. In some illustrative examples, two alignment tools may be associated with stringers in composite rework panel 1300. In other illustrative examples, more than two alignment tools may be associated with stringers in composite rework panel 1300.

The different components shown in FIGS. 1-2 and 4-6 may be combined with components in FIG. 3, used components in FIG. 3, or a combination of the two. Additionally, some of the components in FIGS. 1-2 and 4-6 may be illustrative examples of how components shown in block form in FIG. 3 can be implemented as physical structures.

Figure 15:
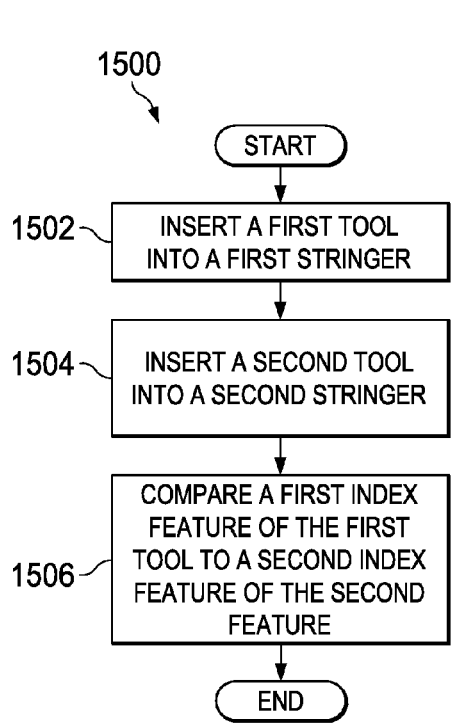
FIG. 15 is an illustration of a flowchart of a process for aligning a stringer in accordance with an illustrative embodiment.

Turning now to FIG. 15, an illustration of a flowchart of a process for aligning a stringer is depicted in accordance with an illustrative embodiment. Process 1500 may be used to align stringer 302 of FIG. 3 relative to stringer 306 of FIG. 3.

Process 1500 begins by inserting a first tool into a first stringer (operation 1502). The first tool may take the form of an alignment tool, such as alignment tool 312 of FIG. 3. The first tool may self-align to a centerline of the first stringer. The first tool may maintain its own position within the first stringer.

Process 1500 then inserts a second tool into a second stringer (operation 1504). The second tool may have the same design as the first tool. The second tool may also be an alignment tool, such as alignment tool 310 of FIG. 3. The second tool may self-align to a centerline of the second stringer. The second tool may maintain its own position within the second stringer.

A first index feature of the first tool is then compared to a second index feature of the second tool (operation 1506). Afterwards, the process terminates. The first index feature of the first tool may indicate the centerline of the first stringer. The second index feature of the second tool may indicate the centerline of the second stringer. In some illustrative examples, comparing the first index feature of the first tool to the first index feature of the second tool comprises determining a distance between the first index feature and the second index feature. The distance between the first index feature and the second index feature may indicate a distance between the centerline of the first stringer and the centerline of the second stringer.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, process 1500 may further comprise determining if the first stringer and second stringer are in alignment using the distance between the first index feature and the second index feature. If the distance between the first index feature and the second index feature is within tolerance, the first stringer and the second stringer may be considered in alignment.

Further, process 1500 may comprise adjusting one of a location of the first stringer or a location of the second stringer if the first stringer and the second stringer are not in alignment. The position of the first stringer may be changed by changing the position of a composite structure containing the first stringer. In some illustrative examples, the composite structure may take the form of composite structure 308 or composite rework panel 304 of FIG. 3. The position of the second stringer may be changed by changing the position of a composite structure containing the second stringer. In some illustrative examples, the composite structure may take the form of composite structure 308 or composite rework panel 304 of FIG. 3.

In some illustrative examples, process 1500 may further comprise interacting with an interactive feature of the first tool after determining if the first stringer and second stringer are in alignment using the distance between the first index feature and the second index feature. Process 1500 may also comprise removing the first tool from the first stringer while interacting with the interactive feature.

Figure 16:
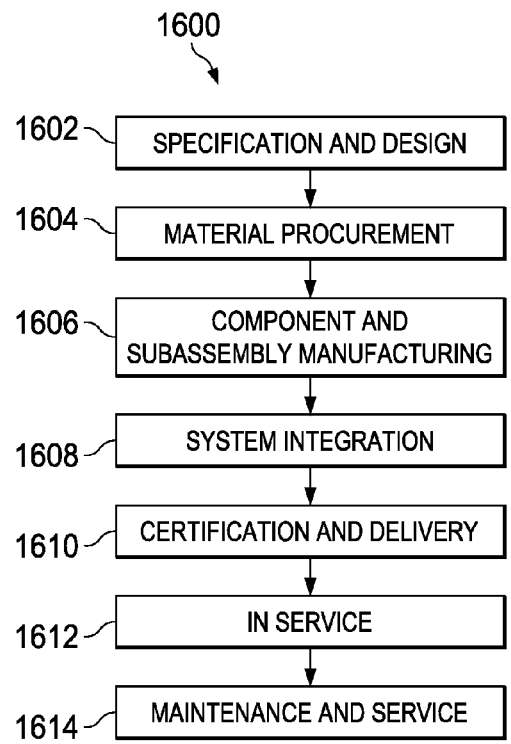
FIG. 16 is an illustration of an aircraft manufacturing and service method in the form of a block diagram in accordance with an illustrative embodiment.
Figure 17:
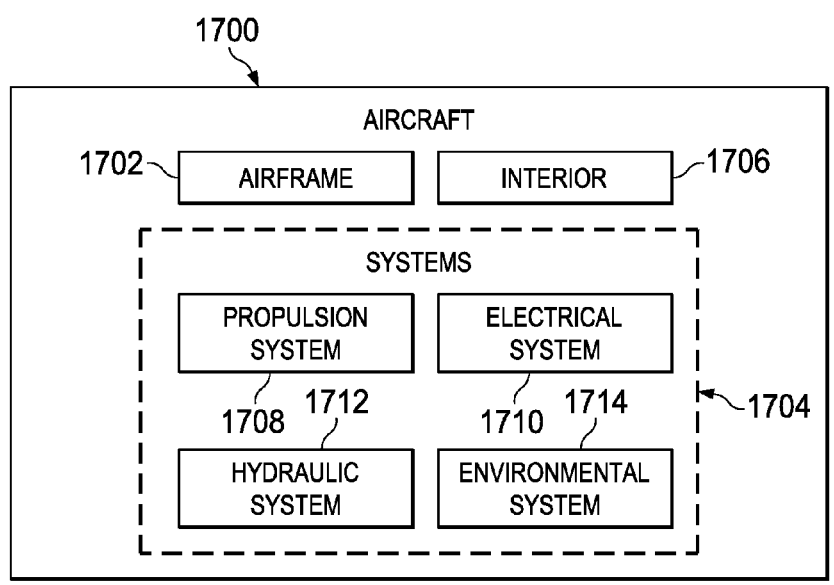
FIG. 17 is an illustration of an aircraft in the form of a block diagram in which an illustrative embodiment may be implemented.

The illustrative embodiments of the present disclosure may be described in the context of aircraft manufacturing and service method 1600 as shown in FIG. 16 and aircraft 1700 as shown in FIG. 17. Turning first to FIG. 16, an illustration of an aircraft manufacturing and service method is depicted in the form of a block diagram in accordance with an illustrative embodiment. During pre-production, aircraft manufacturing and service method 1600 may include specification and design 1602 of aircraft 1700 of FIG. 17 and material procurement 1604.

During production, component and subassembly manufacturing 1606 and system integration 1608 of aircraft 1700 of FIG. 17 takes place. Thereafter, aircraft 1700 of FIG. 17 may go through certification and delivery 1610 in order to be placed in service 1612. While in service 1612 by a customer, aircraft 1700 of FIG. 17 is scheduled for routine maintenance and service 1614, which may include modification, reconfiguration, refurbishment, and other maintenance or service.

Each of the processes of aircraft manufacturing and service method 1600 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 17, an illustration of an aircraft is depicted in the form of a block diagram in which an illustrative embodiment may be implemented. In this example, aircraft 1700 is produced by aircraft manufacturing and service method 1600 of FIG. 16 and may include airframe 1702 with systems 1704 and interior 1706. Examples of systems 1704 include one or more of propulsion system 1708, electrical system 1710, hydraulic system 1712, and environmental system 1714. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1600 of FIG. 16. As used herein, the phrase "at least one of," when used with a list of items, means different combinations of one or more of the listed items may be used and only one of each item in the list may be needed. In other words, "at least one of" means any combination of items and number of items may be used from the list but not all of the items in the list are required. The item may be a particular object, thing, or a category.

For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations.

One or more illustrative embodiments may be used during component and subassembly manufacturing 1606. For example, alignment tools such as alignment tool 312 of FIG. 3 may be used to align structures during component and subassembly manufacturing 1606. As another example, alignment tools such as alignment tool 312 of FIG. 3 may be used to align structures when performing a rework during either component and subassembly manufacturing 1606 or during maintenance and service 1614.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A tool comprising:
   an index feature indicating a centerline of an enclosure;
   a body having a longitudinal axis running substantially parallel to the centerline of the enclosure;
   a number of legs moveably associated with the body; and
   a biasing member that contacts the body, wherein the biasing member biases the number of legs towards a selected position.

2. The tool of claim 1 further comprising:
   a casing containing a portion of the body, wherein a remainder of a portion of the body forms an interactive feature.

3. The tool of claim 2, wherein interacting with the interactive feature causes the number of legs to move relative to the body.

4. The tool of claim 2, wherein interacting with the interactive feature actuates the biasing member.

5. The tool of claim 2, wherein the casing contains a number of cavities, and wherein each of the number of cavities has a respective stop for the body.

6. The tool of claim 2, wherein the casing includes a removal portion that aids in removal of the tool from the enclosure.

7. The tool of claim 2, wherein the casing includes a profile designed to fit within the enclosure.

8. The tool of claim 2, wherein the index feature is a component of the casing.

9. The tool of claim 1, wherein the body has a number of wedge grooves, and wherein each of the number of legs has a respective protrusion that is associated with a respective wedge groove of the number of wedge grooves.

10. The tool of claim 1, wherein each of the number of legs has an end with a rounded shape.

11. The tool of claim 1 further comprising:
a number of adapters associated with the number of legs.

12. The tool of claim 1, wherein the biasing member biases the number of legs to move outward from the body.

13. A tool comprising:
a casing having an index feature;
a body having number of wedge grooves within the casing and an interactive feature outside of the casing;
a number of legs movable relative to the body, wherein each leg of the number of legs has a respective protrusion that interacts with a respective wedge groove of the number of wedge grooves; and
a biasing member associated with the body and configured to bias the number of legs outward from the body.

14. The tool of claim 13, wherein the casing has a removal portion that aids in removal of the tool from an enclosure.

15. The tool of claim 13 further comprising:
a number of adapters associated with the number of legs.

16. A method comprising:
inserting a first tool into a first stringer, the first tool comprising: a first index feature indicating a centerline of the first stringer, a body having a longitudinal axis running substantially parallel to the centerline of the first stringer, a number of legs moveably associated with the body, and a biasing member that contacts the body, wherein the biasing member biases the number of legs towards a selected position;
inserting a second tool into a second stringer; and
comparing the first index feature of the first tool to a second index feature of the second tool.

17. The method of claim 16, wherein comparing the first index feature of the first tool to the second index feature of the second tool comprises determining a distance between the first index feature and the second index feature.

18. The method of claim 17 further comprising:
determining if the first stringer and second stringer are in alignment using the distance between the first index feature and the second index feature.

19. The method of claim 18 further comprising:
adjusting a location of the first stringer or a location of the second stringer if the first stringer and the second stringer are not in alignment.

20. The method of claim 18 further comprising:
interacting with an interactive feature of the first tool after determining if the first stringer and second stringer are in alignment using the distance between the first index feature and the second index feature; and
removing the first tool from the first stringer while interacting with the interactive feature.

* * * * *